Jan. 12, 1971 W. B. CONRAD 3,554,050
MOTION TRANSMITTING REMOTE CONTROL ASSEMBLY
Filed June 30, 1969
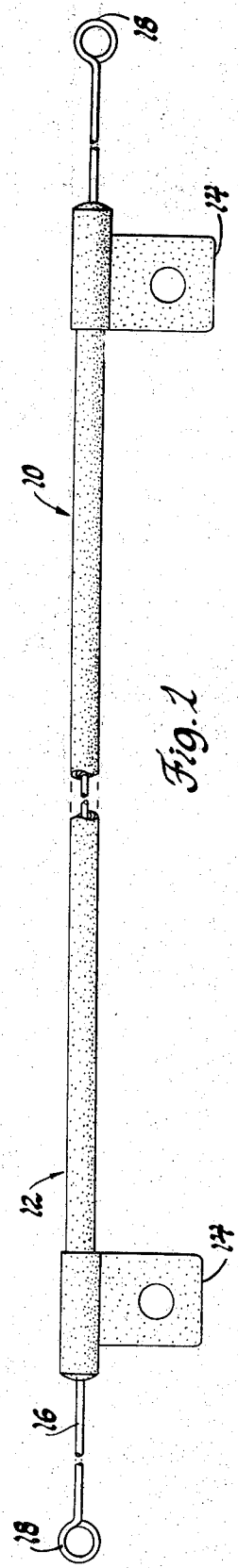
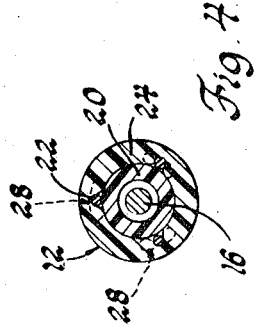
INVENTOR.
Winthrop B. Conrad
BY
Barnard, McGlynn & Reising
ATTORNEYS though the inner tubular member 20 may assume various forms, it is preferred that it be made
United States Patent Office 3,554,050
Patented Jan. 12, 1971

---

3,554,050
MOTION TRANSMITTING REMOTE CONTROL ASSEMBLY
Winthrop B. Conrad, Franklin, Mich., assignor to Teleflex Incorporated, North Wales, Pa., a corporation of Delaware
Filed June 30, 1969, Ser. No. 837,692
Int. Cl. F16c 1/26
U.S. Cl. 74—501
12 Claims

ABSTRACT OF THE DISCLOSURE

A flexible motion transmitting remote control assembly of the type including a flexible motion transmitting core element movably supported by a flexible conduit with fittings secured to the conduit and adapted for connection to a support structure and wherein the conduit comprises an inner tubular member of organic polymeric material disposed about the wires and the inner tubular member with the improvement being that the long lay wires have a plurality of irregularities at spaced intervals therealong.

---

This invention relates to a motion transmitting remote control assembly of the type utilized to transmit tension and compression in a curved path by flexible motion transmitting core element.

More specifically, the instant invention relates to a motion transmitting remote control assembly of the type including a conduit with an inner tubular member of organic polymeric material surrounding the filaments and the inner tubular member. Typically, the filaments comprise metal wires. Remote control assemblies utilizing such conduits are very flexible and have memory in that the conduit tends to return to a straight or an original configuration and the wire filaments act as tension bearing members to control or prevent elongation of the conduit.

In fabricating such a conduit the filaments or long lay wires are helically disposed about the inner tubular member and the casing of organic polymeric material is extruded about the wires and the inner tubular member. Such extruding is done continuously with the continuous length of conduit being subsequently cut into sections. It frequently occurs, however, that after cutting the sections, the outer casing shrinks back from the ends of the long lay wires, this being referred to as shrinkback. Such shrinkback creates problems in the fabrication of remote control assemblies. For example, when the conduit sections are cut, they are frequently cut adjacent grooves or the like formed in the outer casing of the conduit so that the outer casing of the conduit will have grooves or the like disposed adjacent the ends thereof about which a fitting of organic polymeric material may be molded so as to be retained in mechanical interlocking engagement with the conduit. If the outer casing shrinks back a reduced length of the casing will be disposed in the fitting and frequently a number of the grooves in the casing are not surrounded by the fitting thereby greatly reducing the force necessary to pull the fitting from the conduit. Additionally, shrinkback exposes the long lay wires and such extension of the long lay wires can cause damage to the molds in which the ends of the conduit are disposed for molding fittings thereabout.

In an effort to overcome the shrinkback problem, remote control assemblies have been fabricated wherein the long lay wires are continuously corrugated along their length. Such has created other serious drawbacks such as a significant and undesirable reduction in the flexibility of the conduit and a very substantial increase in the weight of the assembly as compared to a like assembly not having such continuous corrugations.

Accordingly, it is an object and feature of this invention to provide an improved motion transmitting remote control assembly including a conduit having an inner tubular member surrounded by filaments disposed helically thereabout on a long lead with a casing disposed about the filaments and with the filaments having irregularities therein at spaced intervals therealong so as to overcome the shrinkback problem associated with the casing yet providing a remote control assembly having the requisite flexibility characteristics and without a significant increase in weight.

Other objects and attendant advantages of the present invention will be readily appreciated as the same becomes better understood by reference to the following detailed description when considered in connection with the accompanying drawings wherein:

FIG. 1 is an elevational view of a preferred embodiment of the instant invention;

FIG. 2 is a fragmentary cross-sectional view of the preferred embodiment of the instant invention;

FIG. 3 is an enlarged fragmentary view similar to FIG. 2; and

FIG. 4 is a cross-sectional view taken substantially along line 4—4 of FIG. 3.

Referring now to the drawings wherein like numerals indicate like or corresponding parts throughout the several views, a flexible motion transmitting remote control assembly constructed in accordance with the instant invention is generally shown at 10.

The motion transmitting remote control assembly 10 includes a guide means including the conduit generally indicated at 12, the fittings 14, and a flexible motion transmitting core element 16.

The flexible motion transmitting core element may take various forms but is shown as a metal wire element having loops at each end thereof for attachment to control members for transmitting motion therebetween.

The flexible conduit 12 includes an inner tubular member 20 which is preferably made of organic polymeric material. Also included are three filaments comprising circular metal wires 22. The metal wires 22 are helically disposed about the inner tubular member 20 on a long lead. The angle of the lead is preferably above 75 degrees. The conduit also includes a casing 24 of organic polymeric material disposed about the inner tubular member 20 and the long lead wires 22.

The inner tubular member 20 may be formed in any desired manner and of a suitable material so as to ensure its flexibility and provide a low friction support to permit the core element 16 to be freely slidably movable therewithin. While the inner tubular member 20 may thus assume many forms, it is preferred that it be made by an extruded organic polymeric or plastic material having inherent lubricity. Highly desirable materials are the superpolyamide resins, commonly known as nylon, and polytetrafluoroethylene, also known at Teflon. In those instances where the operating requirements are not too severe and where lower conduit costs are important, less expensive plastic material such as polyethylene, polypropylene, etc., may be used to advantage.

The outer flexible casing 24 may also be made of the aforementioned organic polymeric or plastic materials and is also generally formed by extrusion. In addiiton, various other polymeric or plastic materials such as the polyvinyls, for example, plasticized polyvinylchloride, may be used for the casing 24.

The fittings 14 are also preferably made of an organic polymeric or plastic material and are molded about the casing 24. The casing 24 may have grooves or other deformities therein so that the fitting 14 when molded thereabout will be in mechanical interlocking engagement with the conduit 12. Many of the well-known organic polymeric or plastic materials may be used as the material for the fittings 14; for example, nylon, Teflon, the synthetic elastomers, polyvinyls, polyethylene, polypropylene, or their co-polymers.

The conduit will include at least one filament such as a wire 22 and each wire 22 will have a plurality of straigth sections 26 separated by irregularities which are generally shown at 28. As illustrated, the irregularities 28 comprise a plurality of corrugations or reverse bends. It is to be understood however that the irregularities 28 may take many other forms so long as they are in mechanical interlocking engagement with the outer casing 24. Expressed another way, each wire 22 has a plurality of irregularities 28 at spaced intervals therealong and which irregularities are separated by uniform straight sections, i.e. non-deformed straight sections.

In order for the conduit to possess the desired flexibility characteristics there must be relative movement between the wires 22 and the inner tubular member 20. Thus, in the preferred embodiment it is desirable that a lubricant be disposed about the exterior surface of the inner tubular member 20 to facilitate relative movement between the inner tubular member 20 and the relatively immovable combination of the long lay wires 22 and the casing 24. In other words, the lubricant will enhance movement of the inner tubular member 20 relative to the long lay wires 22 and the outer casing 24 although the outer casing 24 will not move over its entire length relative to the long lay wires 22; albeit some relative movement may occur between the casing 24 and the long lay wires 22 along the straight portions 26 of the long lay wires 22.

In the preferred embodiment the irregularities 28 are spaced along the respective long lay wires 22 approximately six inches apart. Although it should be understood that this distance may vary depending on many factors, such as the environment and the size of the various elements making up the remote assembly 10.

The embodiments of the invention in which an exclusive property or privilege is claimed are defined as follows:

1. A motion transmitting remote control assembly comprising: guide means; a motion transmitting core element movably supported by said guide means including a flexible conduit comprising an inner tubular member, at least one filament helically disposed about said inner tubular member on a long lead, and a casing disposed about said filament and said inner tubular member, said filament having a plurality of straight sections separated by irregularities therein.

2. An assembly as set forth in claim 1 wherein said casing is made of organic polymeric material.

3. An assembly as set forth in claim 2 wherein said inner tubular member is made of organic polymeric material.

4. An assembly as set forth in claim 3 including a lubricant disposed about the exterior surface of said inner tubular member.

5. An assembly as set forth in claim 3 including a plurality of said filaments and wherein each of said filaments comprises a metal wire.

6. An assembly as set forth in claim 5 wherein said irregularities are spaced approximately six inches apart along each wire.

7. An assembly as set forth in claim 1 wherein said irregularities comprise a plurality of corrugations.

8. An assembly as set forth in claim 5 wherein said guide means includes at least one fitting of organic polymeric material secured to said conduit and adapted for attachment to a support structure, and said core element is a flexible wire.

9. An assembly as set forth in claim 5 including three of said wires.

10. In a motion transmitting remote control assembly of the type including a flexible motion transmitting core element movably supported by a flexible conduit with at least one fitting secured to the conduit and adapted for connection to a support structure and wherein said conduit comprises an inner tubular member of organic polymeric material with a plurality of long lay wires disposed helically on a long lead about said inner tubular member and a casing of organic polymeric material disposed about said wires and said inner tubular member, the improvement comprising a plurality of irregularities at spaced intervals along said wires, said irregularities comprising groups of reverse bends spaced from one another by uniform straight sections.

11. A flexible conduit comprising; an inner tubular member, a plurality of long lay filaments disposed helically on a long lead about said inner tubular member and a casing of organic polymeric material disposed about said inner tubular member and said filaments, said filaments having a plurality of uniform straight sections separated by irregularities therein.

12. A conduit as set forth in claim 11 wherein each of said filaments comprises a metal wire.

References Cited

UNITED STATES PATENTS 3,395,551 8/1968 Morse _____ 74—501X
3,477,474 11/1969 Mesler _____ 138—133

MILTON KAUFMAN, Primary Examiner

U.S. Cl. X.R.

138—133